(12) United States Patent
Merati

(10) Patent No.: US 11,128,794 B2
(45) Date of Patent: Sep. 21, 2021

(54) AUGMENTED REALITY REAL ESTATE MLS AND VIRTUAL TOURS

(71) Applicant: UPLAY1, San Diego, CA (US)

(72) Inventor: Bruce Merati, San Diego, CA (US)

(73) Assignee: Uplay1, Las Vegas, NV (US)

( * ) Notice: Subject to any disclaimer, the term of this patent is extended or adjusted under 35 U.S.C. 154(b) by 0 days.

(21) Appl. No.: 16/046,596

(22) Filed: Jul. 26, 2018

(65) Prior Publication Data

US 2019/0037134 A1 Jan. 31, 2019

Related U.S. Application Data

(60) Provisional application No. 62/539,443, filed on Jul. 31, 2017.

(51) Int. Cl.

| H04N 5/232 | (2006.01) |
| H04N 5/77 | (2006.01) |
| H04N 7/18 | (2006.01) |
| G06Q 50/16 | (2012.01) |
| G06T 7/62 | (2017.01) |
| H04N 5/76 | (2006.01) |
| G06K 9/62 | (2006.01) |
| G06T 11/60 | (2006.01) |
| H04N 21/4223 | (2011.01) |
| G06F 3/0482 | (2013.01) |
| H04N 5/272 | (2006.01) |

(52) U.S. Cl.
CPC ....... *H04N 5/23222* (2013.01); *G06K 9/6215* (2013.01); *G06Q 50/163* (2013.01); *G06T 7/62* (2017.01); *G06T 11/60* (2013.01); *H04N 5/76* (2013.01); *H04N 5/77* (2013.01); *H04N 7/185* (2013.01); *G06F 3/0482* (2013.01); *G06T 2207/10016* (2013.01); *G06T 2207/30241* (2013.01); *H04N 5/272* (2013.01); *H04N 21/4223* (2013.01)

(58) Field of Classification Search
None
See application file for complete search history.

(56) References Cited

U.S. PATENT DOCUMENTS

| 10,929,798 B1* | 2/2021 | Kinney | G06Q 10/06398 |
| 2013/0226451 A1* | 8/2013 | O'Neill | G01C 21/206 |
| | | | 701/450 |
| 2015/0294396 A1* | 10/2015 | Goodwin | G06Q 30/0639 |
| | | | 705/26.9 |
| 2019/0005719 A1* | 1/2019 | Fleischman | G06T 7/73 |
| 2019/0020817 A1* | 1/2019 | Shan | H04N 5/23238 |

\* cited by examiner

*Primary Examiner* — Hung Q Dang
(74) *Attorney, Agent, or Firm* — Thibault Patent Group

(57) ABSTRACT

An apparatus, system and method to ensure accurate and complete video representation of a property. A mobile device receives information from a trusted source of various physical attributes of a property. The mobile device then evaluates digital video captured by the mobile device to determine a particular room or area of the property is being recorded. Once all rooms and areas of the property have been recorded, as determined by the mobile device, the digital videos may be shared with others.

20 Claims, 4 Drawing Sheets

AUGMENTED REALITY REAL ESTATE MLS AND VIRTUAL TOURS

CROSS-REFERENCE TO RELATED APPLICATIONS

This application claims the benefit of U.S. provisional patent application Ser. No. 62/539,443, filed on Jul. 31, 2017.

BACKGROUND

I. Field of Use

The present application relates to the field of real estate. More specifically, it relates to a system and method for providing an interactive virtual tour of properties for sale or lease.

II. Description of the Related Art

A walk through is an essential part of buying or leasing a real estate property.

Buyers and tenants usually hire real estate agents familiar with a market to find the property they are looking to buy or to lease. Similarly, real estate owners looking to sell or to rent commercial or residential properties also hire real estate agents to market and sell their properties. Realtors have developed Multiple Listing Services (MLS) and other online resources to make property transactions more effective. Today, there are over 800 separate MLSs in the U.S. that agents and brokers use as their principal source for soliciting potential buyers. The goal of an MLS is to bring agents representing buyers and sellers to a trusted website that lists properties for sale or for rent in a city or in a metropolitan area. Listing properties on an MLS creates exposure to agents representing buyers and provides the tool for comparing available properties for sale to narrow down the selection process to a handful of properties for a walk through. Another objective of an MLS is to level the playing field for all real estate agents to enable a single self-employed broker to compete with a major multi-state corporation.

Oftentimes real estate agents showcase their listings by hosting open houses, which usually are held in late mornings or early afternoons of a weekend day. Hosting an open house appeals to both buyers and sellers. Buyers get the opportunity to see a number of homes without the need for making appointments or be accompanied by a real estate agent, and sellers show their properties to a number of buyers within a two or three hour period. In some markets, lockbox showings are the best way to see a home for sale. To get access to the inside of a house, a listing agent places a special lockbox on the front door for agents to get access into the property with their buyer clients. Some buyers, after reviewing the advertisement of a property in a local newspaper or an online web site, drive by the property first before asking their agents to set up a time to view its inside. Most buyers visit a property several times before making an offer. Buyers who narrow down their selections and get interested in a particular property usually by then have already viewed the property at least a couple of times, and once they get serious, they go back for a final visit, this time accompanied by their agents to talk to the seller's agent to discuss an offer.

Overall, effectuating a real estate transaction is currently a very labor-intensive process and has several inefficiencies and shortcomings. The most time consuming part of a real estate transaction is time spent by agents, sellers and landlords showing their properties and buyers and tenants viewing a number of properties before making an offer. Even with all the technologies that exist today, buyers and tenants still lack full visibility as to all the details and features of an advertised property and have to personally view the inside of many properties that match both the price range and their other requirements such as square footage, number of bedrooms, etc. before making an offer. Although selling agents post pictures of listed properties on an MLS, their efforts are usually biased towards positive aspects and avoid presenting the negative aspects of a property.

In recent years, other than posting on an MLS, real estate agents and brokers have begun online marketing gimmicks that provide minimal information such as price, square footage, a picture of the outside, and some pictures and videos of its rooms, kitchen and other amenities with the goal of enticing buyers to call for more information or to set up appointments to see the property. Currently, the panoramic pictures or videos of a property for sale do not provide potential buyers and tenants with the full visibility and assurance that they are unbiased representations of the entire property. A comprehensive online view of the inside and the outside of a property could provide buyers and tenants a high degree of knowledge about the property and would change their mind-set that they have to see the inside of many properties before buying a property. Full online transparency of all areas of a property could bring efficiencies to the real estate market and would lower current commission rates.

In summary, selling a property is a time consuming and expensive process with homeowners usually required to pay as much as 5 to 6 percent of the selling price in commissions. Although the commission rates for selling residential homes have recently been declining and, for commercial properties, the percentages have historically been less than residential properties, the dollar amount of real estate commission is substantial. Other businesses, such as the financial industry, have already gone through major overhauls pushing down commissions for buying and selling stocks and bonds. As a result, the need for speaking to a stockbroker is now eliminated and replaced with visiting online websites that facilitate transactions between buyers and sellers through trading programs.

The rise of broadband Internet and growing ubiquity of Internet access, together with 360-degree and VR180 cameras, as well as 3D editing software programs, have made production of virtual tours of inside of a structure inexpensive and widely available. There are now 3D, 360 degree and DSLR cameras in the marketplace that can capture panoramic views and videos, which during playback allow a viewer to have an immersive experience and control over viewing inside of a property. Even though the technology of recording panoramic views of a property has become inexpensive and mainstream, today's Virtual Realty (VR) and 3D views still do not offer a full view of a property or even if they do, they don't provide full interactivity to all sections of the property to give the viewers adequate assurance that they have a complete and unbiased video of all sections and aspects of the property. As an example, a buyer might be interested in the orientation of a property and its rooms in relation to the sun, the shape and dimension of the dining area, the outside views from windows, etc. Also in the cases that the property is a multi-dowelling unit or is in a high rise building, the buyer might be interested to know the distance from the street or from the garage into the building's lobby, and then all the way to the unit's front door and then to the inside of the property. Overall, the ability to have a complete scrutiny of all aspects of a property using devices such as VR handsets can expose negative features of a property, such as peeling exterior paint or an excessive number of steps in getting into inside of the property, etc. that currently has to be explored by visiting the property in person.

Thus, it would be desirable to offer interactive, virtual property tours that include all areas of a property.

SUMMARY

The embodiments described herein relate to system, method and apparatus for providing a virtual walk-through of a property. In one embodiment, a mobile device is described, comprising a camera module for generating digital videos, a location module for determining a location of the mobile device, a communication interface for receiving information over a wide-area network, a memory for storing processor-executable instructions, and a processor coupled to the camera, the location module, the communication interface and the memory for executing the processor-executable instructions that causes the mobile device to receive, by the processor via the communication interface, physical attributes of the property from a trusted source create, by the camera module, one or more digital videos of the property, determine, by the processor, that the one or more digital videos completely represent the physical attributes, and upload, by the processor via the communication interface, the one or more videos only when the one or more videos completely represent the physical attributes of the property.

In another embodiment, a method is described, comprising receiving, by a processor via a communication interface, physical attributes of the property from a trusted source, creating, by a camera module, one or more digital videos of the property, determining, by the processor, that the one or more digital videos completely represents the physical attributes, and uploading, by the processor via the communication interface, the one or more videos only when the one or more videos completely represents the physical attributes of the property.

BRIEF DESCRIPTION OF THE DRAWINGS

The features, advantages, and objects of the embodiments of the present invention will become more apparent from the detailed description as set forth below, when taken in conjunction with the drawings in which like referenced characters identify correspondingly throughout, and wherein.

DETAILED DESCRIPTION

The ideas presented herein relate to various embodiments of an apparatus, method and system for recording and viewing a virtual tour of real estate. The goal is to provide one or more videos and/or virtual tours of a property that completely represents the property, to give potential purchasers or renters a better sense of what the property really looks like. The term "completely represents" means that at least each room of a property is recorded as one or more digital images and/or digital video, and this may be determined by a variety of methods, as described later herein. It may also refer to each room plus each hallway, and/or at least one exterior view of a property. As used herein, the term "property" refers to land and/or a structure on the land, such as a residential home or commercial building. It should be noted that the system architecture diagrams and the steps specified in the flow diagrams are shown as examples of one or more embodiments for implementing a comprehensive recording and viewing system and words "video", "Virtual Reality", "VR", "Augmented Reality" and "AR" may be used interchangeably herein.

Figure 1:
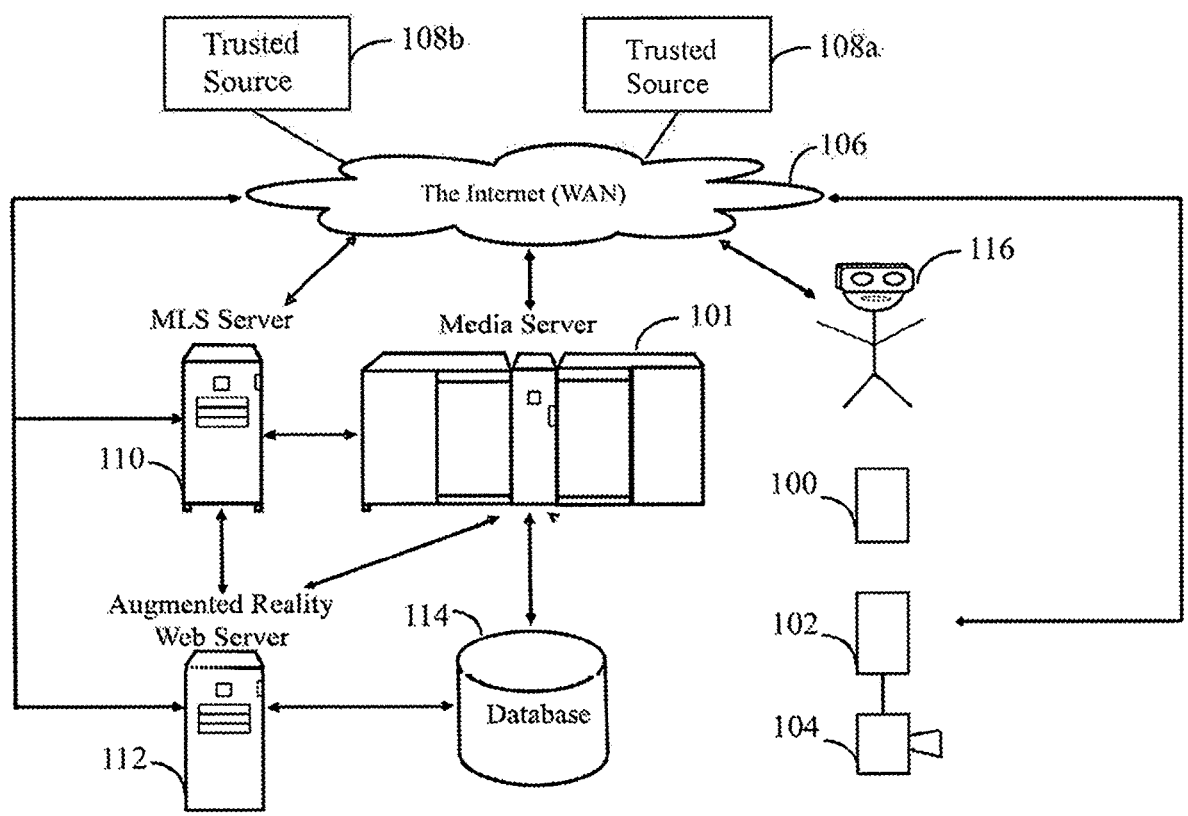
FIG. 1 illustrates one embodiment of an architectural overview for recording, storing, and viewing a virtual tour of a property.

FIG. 1 illustrates one embodiment of an architectural overview for recording, storing, and viewing a virtual tour of a property. For the purpose of describing the diagrams presented herein, the person making the video recording may be referred to as "Seller" and the person viewing the video is referred to as "Buyer". However, it should be noted that the person who records the virtual tour could be either a landlord looking to sell or to lease his or her property, a real estate agent or an appraiser hired by the landlord to list the property or a third party specializing in taking videos, or anyone else interested in providing a virtual tour of a property. Also, the person viewing the virtual tour could be a buyer, a tenant, a real estate agent, a lender, an appraiser etc.

In a preferred embodiment, the seller uses a mobile device 100 such as a laptop, tablet, smartphone, or Internet-capable camera to record a virtual tour of a property. In this embodiment, all of the functionality needed to create a virtual tour in accordance with the teachings herein are performed by the mobile device. In another embodiment, a user may use a specialized camera 104, such as a Pro2 3D camera sold by Matterport, Inc. of Sunnyvale, Calif., where digital video generated by the camera is provided to a computing device 102, such as a desktop or laptop computer, smartphone, tablet, etc. via wired or wireless means, for processing and distribution by computing device 102 in accordance with the teachings herein.

In the preferred embodiment, mobile device 100 comprises a digital camera for generating digital videos, location hardware for determining a location of the smart device and executable software stored in memory, commonly known as an "app", for guiding a seller to generate a virtual tour that is accurate and complete. Mobile device 100 may receive physical attributes of a property over wide-area network 106 from one or more trusted sources, such a blueprint of a property, a floorplan, a location of a property, photographs of a property, square footage of the property or portions thereof, or other information that describes that physical layout of a property. The physical attributes are provided by one or more trusted sources 108a and 108a, such as Google via their Google Maps server, a government entity, such as a city/county/municipality planning or permitting department's server or, generally, a publicly-available source that is trusted by a large number of people to provide unbiased information pertaining to properties.

Once mobile device is provided with the physical attributes of a particular property, it determines various metrics pertaining to the property based on the physical attributes, such as the square footage of each room in the property, a total square footage of the property, one or more paths that the seller can take to ensure that each area/room of the property has been recorded and/or other metrics that a buyer might be interested in. Once the metrics are determined, mobile device may guide a user through the property along the path(s) and provide an easy-to-use interface to update the seller's progress of recording each area/room of the property.

Once the entire property has been recorded (this may include both interior views as well as exterior views of the property), the app (or another app running on the mobile device or other computer or server) may create a virtual tour by offering one or more video recordings to a buyer via wide-area network 106 and Multiple Listing Service (MLS) server 110, augmented reality server 112 and/or media server 101.

In one embodiment, media server 101 is coupled to augmented reality server 112 and in another embodiment, it is couple to MLS server 110, which may be linked to augmented reality server 112. Media server 101 may be coupled to database 114 for storing video recordings as well as physical attributes or other real estate related records. In one embodiment, a buyer may use a viewing device such as a VR headset 116, which is coupled to wide-area network 106 for virtually touring a property. In another embodiment a buyer uses a computer, such as a laptop, tablet or smartphone to view a property in a two and a half dimensional (2.5D) format, a technique used to have images or scenes to simulate the appearance of being three-dimensional (3D).

Figure 2:
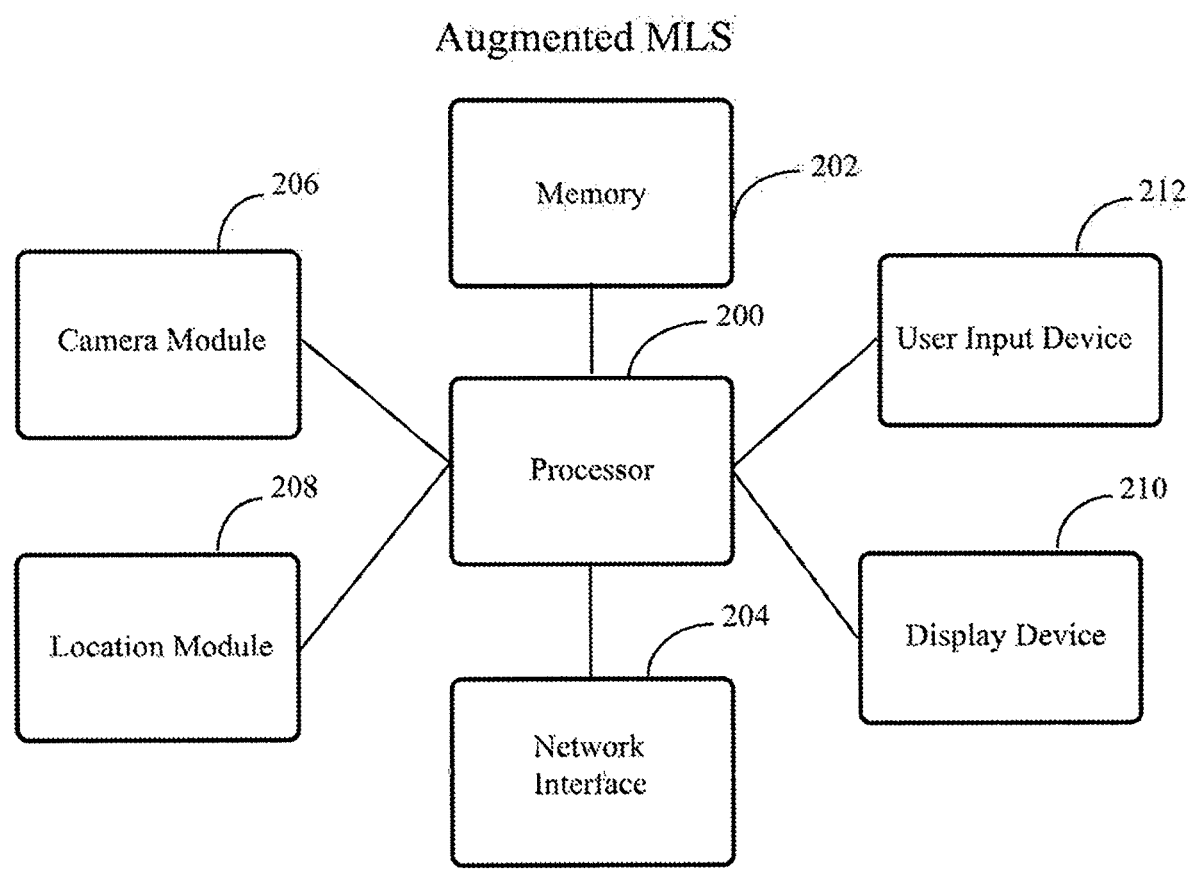
FIG. 2 is a functional block diagram of one embodiment of a mobile device shown in FIG. 1 for recording one or more digital videos and for determining when a property has been accurately and completely been captured by one or more of the digital videos.

FIG. 2 is a functional block diagram of one embodiment of mobile device 100, comprising processor 200, memory 202, network interface 204, camera module 206, location module 208, display device 210, and user input device 212. It should be understood that the functional blocks shown in FIG. 2 could be arranged in different manners in other embodiments. For example, camera module 206 and location module 208 could be located in a specialized digital camera, while the remaining components located in another device, such as a desktop or laptop computer, tablet or smartphone, where digital video generated by the specialized digital camera could be provided to the other device via wired or wireless means.

Processor 200 comprises one or more general-purpose or specialized microprocessors, microcomputers, microcontrollers and/or custom or semi-custom ASICs able to perform the functionality required mobile device 100 to ensure that all views of a property are recorded. Processor 200 is typically selected based on such factors such as price, computing power, power consumption, and size.

Memory 202 is coupled to processor 200 and comprises one or more non-transitory information storage devices, such as RAM, ROM, flash memory, or virtually any other type of electronic, optical, or mechanical memory device, but excludes transitory propagating signals. Memory 202 is used to store processor-executable instructions for execution by processor 200, and also to store information such as physical attributes of a property, digital video recordings of a property, graphical and textual information pertaining to a property, etc.

Network interface 204 comprises circuitry necessary for processor 200 to communicate over one or more digital networks, such as wide-area network 106 (i.e., the Internet) and/or one or more local-area networks (such as a home Wi-Fi network). Such circuitry is well known in the art.

Camera module 206 is coupled to processor 200 and comprises electronic circuitry for generating digital images or digital video. Camera module 206 may comprise its own microprocessor, memory and other electronic components to generate the digital images or video. The images or video may be generated in accordance with one or more digital formats, such as MPEG, AVI, etc. Such camera modules are well known in the art.

Location module 208 is coupled to processor 200 and comprises circuitry to determine a location of mobile device 100. Such circuitry is well-known in the art. In some embodiments, hybrid GPS circuitry is used to provide location using a combination of signals from satellites, cell tower triangulations and other devices such as WIFI routers to determine a location of mobile device 100. Current smartphones such as Apple iPhone and Android phones provide 1 to 3 meter accuracy in reading the coordinate of a location, however, a hybrid positioning process that uses aerial as well as indoor signals increases the accuracy. Inside building devices and sensors such as WIFI, Bluetooth, Beacons, sensors etc. that disseminate frequency signals can be used to create indoor-navigations with accuracies of less than a meter. These devices use a variety of technologies to provide the same general concept used by GPS systems for calculating the location of a point relative to another point. By using radio signals from known reference points, indoor devices can mathematically calculate a location's coordinates using the angles and the distance from one or more reference points. Although GPS accuracy of smartphone maps such as Google, Apple, Waze and other apps installed in a car's navigation system often times exceed 10 meters while driving, they are programmed to work with the device's compass and map of the road the car is driving on to increase geo-location accuracies by snapping the car's position to the road and allowing turn-by-turn navigations.

Display device 210 is coupled to processor 200 and comprises circuitry to electronically display information to a seller during video recording of a property. Display device 210 may comprise one or touchscreens, electronic display devices, LED or LCD panels, audio devices, and/or other human interface devices that present information to a seller.

User input device 212 is coupled to processor 200 and comprises circuitry to allow a seller to interact with mobile device 100, such as to enter information during video recording of a property. User input device 212 may comprise one or more pushbuttons, touchscreen devices, biometric readers, switches, sensors, keypads, microphones, and/or other human interface devices that allow a seller to enter information into mobile device 100.

In one embodiment, display device 210 and user input device 212 are integrated, such as in the case with a touchscreen.

Figure 3:
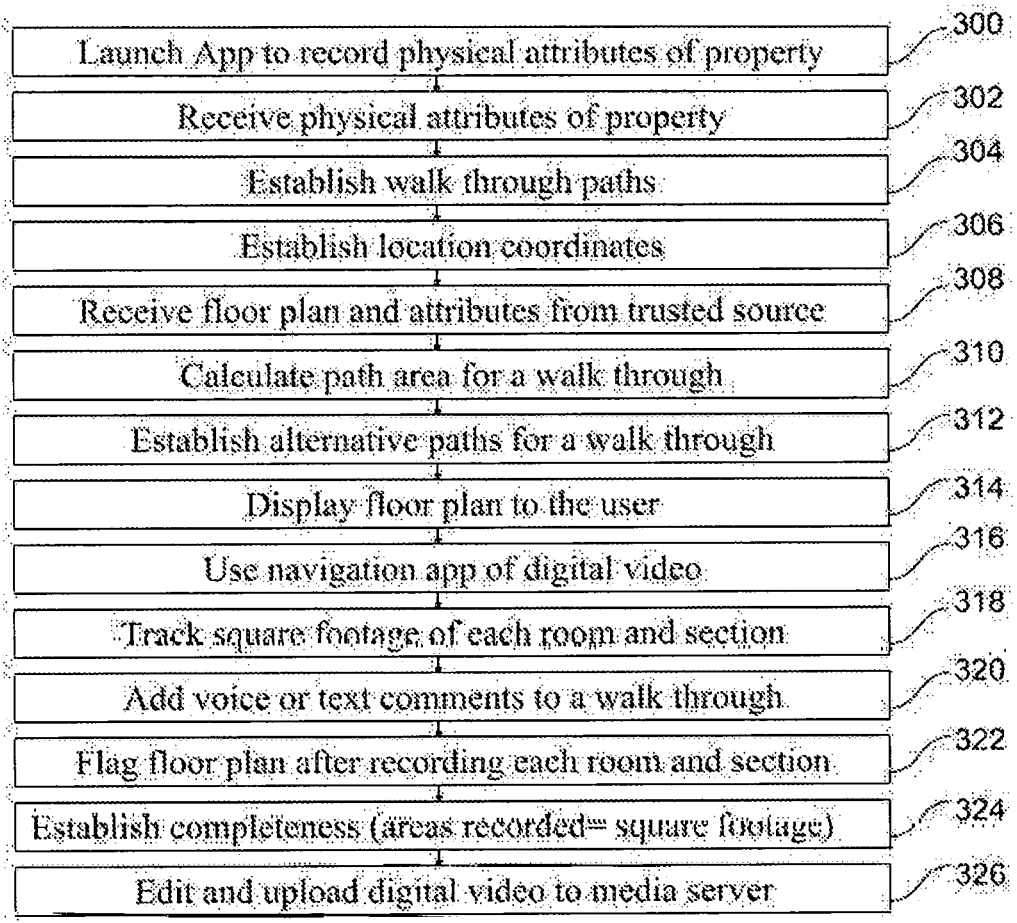
FIG. 3 is a functional block diagram of one embodiment of a method performed by the mobile device shown in FIGS. 1 and 2 to ensure accurate and complete video representation of a property.

FIG. 3 is a functional block diagram of one embodiment of a method performed by mobile device 100 to ensure accurate and complete video representation of a property. In this embodiment, mobile device 100 comprises all of the functional components needed to perform the process. However, it should be understood that the method could be performed by a specialized digital camera in communication with mobile device 100. It should also be understood that some of the steps may be optional, and that the order in which the steps are carried out may be different in other embodiments. It should be further understood that some minor method steps have been omitted for purposes of clarity.

At block 300, a seller launches an app on mobile device 100 that is executed by processor 200 to request physical attributes of a property where the seller intends to conduct a virtual tour recording (such as by using a current location of the seller). Processor 200 receives the property address or location information, then causes network interface 204 to transmit the address or location information to one or more trusted sources, such as a city/county/municipality web server, a widely-used, public web server (i.e., Google Map server).

At block 302, in response to transmitting the address or location of the property of interest, processor 200 receives, via network interface 204, one or more physical attributes of the property. The physical attributes comprise one or more of a blueprint of a property, a floorplan, a location of a property, photographs of a property, square footage of the property or portions thereof, or other information that describes that physical layout of a property.

At step 304, the seller positions him/her self at a reference point somewhere on the property, and then notifies processor 200 when the seller is in position via user input device 212. Preferably, the reference point is somewhere outside of the property, where mobile device 100 can make an accurate location determination using GPS.

At step 306, in response to the notification from the seller in stop 304, processor 200 determines a location of the seller/mobile device by obtaining location information from location module 208, in the form of GPS coordinates or some other form of location information.

At step 306, processor 200 determines location coordinates for one or more property features, such as the exterior corners of the property, the inside corners of each room, landmarks (such as a fountain), etc., based on the received physical attributes, i.e., location of the property as reported in the received physical attributes and distances as reported on a received blueprint or floor plan. For example, knowing the location of the property as reported by Google Maps, and knowing that the property is located twenty feet from the street, the dimensions of the exterior of the property, as well as the layout and dimensions of each room and hallway (as determined from the received blueprint or floor plan), processor 200 calculates multiple location coordinates using well-known geometric principles.

At step 308, processor 200 causes display device 210 to present a floor plan of the property, based on the received physical attributes. In one embodiment, the floor play is overlaid on top of real-time map of the property, i.e., a map provided in real time by Google Maps. Processor 200 uses the location information as provided by location module 208 and a current map view as presented by display device 210, to size and position the floor plan so that it overlays the property. In some cases, due to errors by location module 208, the floor plan might not lie directly over the property. In this case, processor 200 may make a calibration adjustment, by moving the floor plan so that it aligns directly over the property. Processor 200 also adjusts the location coordinates of any property feature in accordance with any such movement of the floor plan to match the property.

In one embodiment, the blueprint, floor plan and/or text showing the size of the rooms and sections can be turned on and off by the seller. For example, if the seller is unsure as to the next turn, the seller can have mobile device 100 display the blueprint, floor plan and/or text, showing the seller's virtual position on the blueprint or floor plan, as well as other information, such as a room's square footage and a path that the seller is on. The seller may also press a button to find out the square footage of a room or use a voice command asking for its square footage.

At step 310, processor 200 may calculate one or more paths for a walk around the property and/or within the property. Paths are determined using the blueprint or floor plan provided to processor 200 at step 302, and are selected to ensure that each room, hallway and section are recorded by mobile device 100. Multiple, shorter paths could be determined in addition to an overall path through the property. For example, a first path could be defined as leading from an entrance of the property to a kitchen. Another path could be defined as leading from the kitchen to a dining room. A path may also be defined "in reverse", to ensure that a person viewing a virtual tour of the property is presented with views both coming and going. For example, one path may be defined as a walk up some stairs, and a second path is defined as a walk down the same stairs. In one embodiment, path(s) may be defined to mimic a physical walk through a buyer would do by going room to room to check each section of the property.

At step 312, other views of the property may be defined by processor 200, based on the physical attributes. For example, if the floor plan shows a window over a kitchen sink, processor 200 may define a "path" as a view through the kitchen window. Similar paths may be defined for bedroom windows, patio sliding doors, etc. Exterior views of the property may also be defined, again based on the property and a boundary of the property as determined by processor 200 from the blueprint, or blueprint in connection with a received boundary map of the property as part of the physical attributes.

At step 314, processor 200 causes display device 210 to present the floor plan to the user and, in one, embodiment, a list of rooms/hallways/sections to be recorded, the list generated by processor 200 in accordance with the received blueprint or floor plan. The list may additionally comprise any paths calculated by processor 200, as well as views that the seller should/must record. A square footage of each room may also be provided, as well as a total square footage of the property. In another embodiment, the blueprint or floor plan is not provided, and only a list of the rooms and paths are shown.

At step 316, the seller may use a navigation app while starting to survey the property, recording digital video as captured by camera module 206, and stored in memory 202 by processor 200. For example, the seller may zoom in on a Google Map of the property, with the floor plan overlaid thereon, to see if the location of seller/mobile device 100 is accurately reflected in terms of the floor plan or view of the property as shown by Google Maps. If the GPS readings are reasonably accurate, as determined by the seller, then a video recording of each room, hallway and section of the property may be associated with the blueprint or floor plan by processor 200. If the location readings provided by location module 208 are not accurate in one or more rooms or sections of the property, then the seller 102 may install or place one or more indoor location beacons for aiding location module 208. For example, one can use tracking devices such as Bluetooth beacons with low frequency radio transmitters that broadcast signals to mobile device 100 to provide location coordinates such as latitude, longitude and level e.g. altitude of mobile device 100 while recording digital videos of the property.

At step 316, the seller begins a digital video recording, recording a room/path/view/section as provided on display device 210. In one embodiment, the seller may select one of the listed rooms/paths/views/sections in the list just before recording the selected area of the property. In another embodiment, selection of a rooms/paths/views/sections is performed after a digital video has been completed, i.e. after recording entry from the street into a living room of the property. In yet another embodiment, the seller does not select a rooms/paths/views/sections from the displayed list.

Rather, processor 200 automatically determines which rooms/hallways/paths/sections have been recorded based on digital videos received from camera module 206, as explained in further detail below.

In the automated embodiment mentioned above, at some point during the recording process (or just before or just after), processor 200 evaluates a location of mobile device 100 while a digital video is being produced by camera module 206, to determine which room/path/view/section is being recorded. In one embodiment, processor 200 determines a location from location module 208 in response to a digital video being produced by camera module 206. In one embodiment, processor 200 compares a location of mobile device 100 to the location coordinates generated by processor 200 at step 306. Processor 200 determines which room/hallway/section of property is being recorded when the location of mobile device 100 is "near" or "in" one of the rooms/hallways/sections. This may be accomplished by processor 200 determining that the location of mobile device 100 is within two or more location coordinates associated with a particular rooms/hallway/sections, or whether the location of mobile device 100 coincides with a particular location coordinate associated with a particular room/hallway/section.

As the seller records the various rooms/hallways/views/sections, processor 200 may ensure that the seller's location is coincidental with the floor plan or blueprint, i.e., that inaccuracies in location module 208 do not exceed a predetermined threshold, such as five feet. Processor 200 may cause the floor plan or blueprint to be moved so that it accurately portrays the seller in relation to the property. For example, if the seller records a walk through from the entrance to the master bedroom and the GPS reading gets off track by a few feet during the walk through, processor 200 "snaps" the floorplan or blueprint back to the path of the mapped walk through. Snapping a walk though to its path makes sure the viewer has the options to turn into another room or section during a walk through.

Processor 200 may also determine that a digital video represents a particular view, for example, through a kitchen window, by evaluating a heading provided by location module 208. The heading comprises a direction that mobile phone 100 is "pointing". For example, if processor 200 determines that a digital video is being produced by camera module 206, and that mobile device 100 is located at a location coordinate determined by processor 200 to be in front of a particular kitchen window, and that the heading of mobile device 100 during the recording is pointed in a direction that coincides with a direction of a view through the window, processor 200 may determine that the digital video being recorded is that of a view through the kitchen window.

Processor 200 may determine that multiple rooms/hallways/sections have or are being recorded by continuing to monitor location module 208 to determine if the mobile device 100 is moving along one of the paths determined by processor 200 in step 310. Processor 200 may actively compare the location of mobile device 100 as determined by location module 208 to the location coordinates and make multiple determinations that multiple rooms/hallways/sections of the property, or that a particular path, are/have been recorded.

At step 318, the seller may measure a square footage of each room using one of a number of measurement apps pre-installed onto mobile device 100, such as Google's Tango app, which uses views of rooms by camera module 206 to detect the mobile device's position relative to the walls around it. In another embodiment the measurement is performed by processor 200 using the location coordinates of, for example, four corners of a room.

At step 320, seller may also add some voice or text comments that are normally provided during a walk through made in person. For example, while recording the living room, the seller may announce "last year the fireplace was converted from wood fireplace to a gas fireplace". The audio or textual comments are received by user input device 212 and provided along with the digital video of the living room, or embedded into the digital video by camera module 206.

At step 322, after processor 200 has determined that a particular room/hallway/view/section/path has been recorded, processor 200 may cause display device 210 to alter the blueprint, floor plan, and/or list of rooms/hallways/views/sections/paths to indicate to the seller that one or more rooms/hallways/views/sections/paths have been recorded. For example, on a blueprint of floorplan, a particular room boundary, representing the room's walls, may be "greyed out" and a description of the room (i.e., master bedroom) may also be greyed out, either on the blueprint or floor plan, or on a list of rooms/hallways/views/sections/paths displayed to the seller, either with or without the blueprint or floor plan. Other techniques to alert the seller that that one or more rooms/hallways/views/sections/paths have been recorded could be used as well, such removing any room/hallway/view/section/path from a list of displayed rooms/hallways/views/sections/paths that have not been recorded, or updating a total square footage of the property that has been recorded. In this embodiment, processor 200 reduces the total number of square feet of the property, as reported by the physical attributes, each time that processor 200 determines that a room has been recorded, based on the square footage of the room, either as provided in the physical attributes or calculated by processor 200 as described above.

At step 324, processor 200 determines that all areas of the property have been recorded, either by determining that each room/hallway/view/section/path have been recorded, or by determining that the square footage associated with each of the digital video recordings add up to the total square footage of the property. Processor 200 may notify the seller that the entire property has been recorded by causing display device 210 to display such a notification such as "All Areas Have Been Recorded".

At step 326, the seller may view and edit each of the digital videos, and/or combine the digital videos into one or more virtual tours, using commonly known apps residing on mobile device 100, or a separate computer or tablet. As part of the editing process, the seller may "drag and drop" an image to the digital videos using an augmented reality app. This feature allows the seller to take images of furniture and paintings, together with their measurements, to virtually see how they will fit into the property. For example, the seller may want to see if his or her eight person dining table fits into the property's dining area. In another example, home developers can showcase different variations of their model homes. In yet another example, architects and builders may show how an addition or improvement to a property would look like in a mixed reality format.

Figure 4:
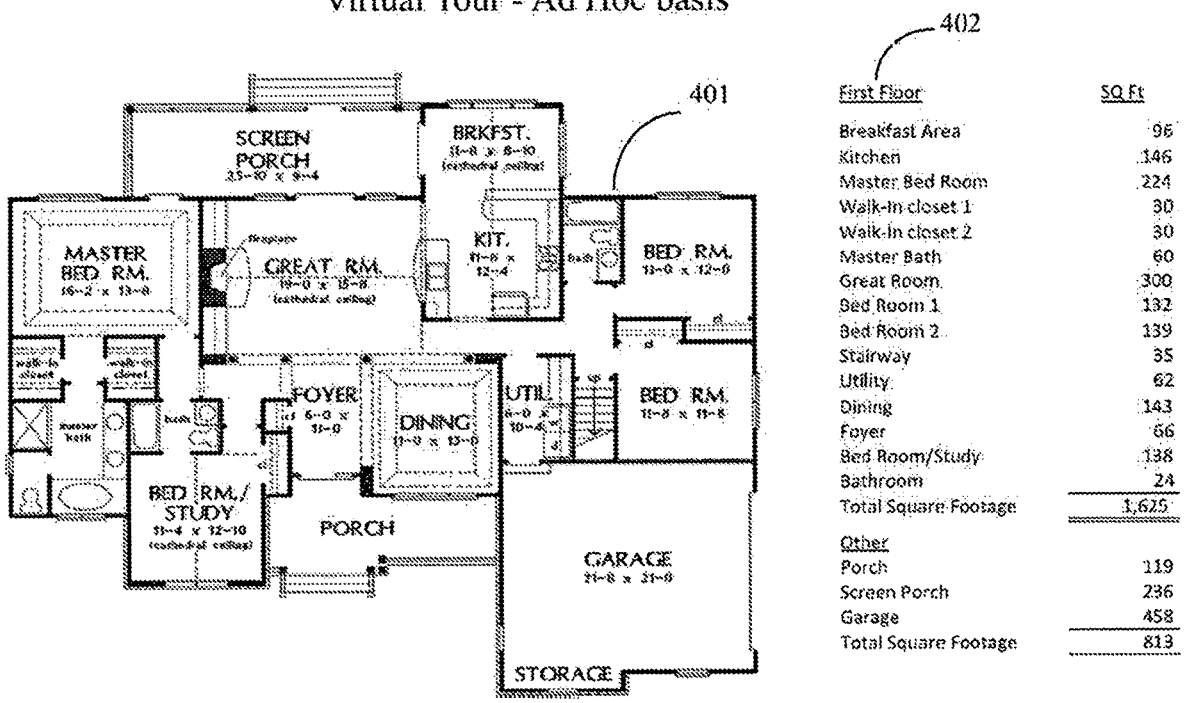
FIG. 4 is one embodiment of typical blueprint, showing the layout and measurements of each room and section of a property.

At step 326, the seller may upload the digital videos and/or virtual tour(s) to a server, such as Multiple Listing Service (MLS) server 110, augmented reality server 112 and/or media server 101, for access to buyers to view the property, guaranteeing that the digital videos and/or virtual tour(s) accurately and/or completely reflects the entire property. However, in one embodiment, processor 200 will only allow an upload when processor 200 has determined that the digital videos have completely recorded the property, using the techniques described above, i.e., that all areas of the property have been recorded or that the square footage associated with each digital video adds up the total square footage of the property. In another embodiment, the digital videos and/or virtual tour(s) may be uploaded by processor 200 upon command by the seller, FIG. 4 is one embodiment of typical blueprint, showing the layout and measurements of each room and section of a property. Menu 402 lists the property's rooms and its different sections such as its garage, porch, etc. as well as their square footage. A buyer can select a room or a section of the property from menu 402 hyperlinked to media server 101 to provide a virtual tour of the selected room or section. A buyer may also request to see a copy of the blueprint and other information, such as the size of a room. As described above, the requested information may be overlaid on a live map of the property. In another embodiment, if a buyer decides to extend an ad-hoc view to other areas of the property, he or she may use the blueprint as a map to navigate to other areas of interest using an input device such as a keyboard, a joystick, a walk or a voice command.

While the foregoing disclosure shows illustrative embodiments of the invention, it should be noted that various changes and modifications could be made herein without departing from the scope of the invention as defined by the appended claims. The functions, steps and/or actions of the claims in accordance with the embodiments of the invention described herein need not be performed in any particular order. Descriptions and abbreviations used herein are provided for ease of discussion only. After reading the description herein, it will become apparent to one of ordinary skill in the art that the present invention can be implemented in any of a number of different computing and networking environments.

I claim:

1. A mobile device for providing a virtual walk-through of a property, comprising:
   a camera module for generating digital videos;
   a location module for determining a location of the mobile device:
   a communication interface for receiving information over a wide-area network;
   an electronic display coupled to the processor;
   a memory for storing processor-executable instructions; and
   a processor coupled to the camera, the location module, the communication interface, the electronic display and the memory for executing the processor-executable instructions that causes the mobile device to;
      receive, by the processor via the communication interface, physical attributes of the property from a trusted source;
      determine, by the processor, a path through the property prior to a user entering the property that ensures each room in the property will be recorded;
      display the path to the user via the electronic display for use by the user to traverse the property in accordance with the path;
      create, by the camera module, one or more digital videos of the property;
      determine, by the processor, that the one or more digital videos completely represents the physical attributes, based on a comparison of the one or more digital videos with the physical attributes; and
      prevent, by the processor, the one or more digital videos from being uploaded to a remote server when the one or more videos do not completely represents the physical attributes of the property, based on the comparison of the one or more digital videos with the physical attributes.

2. The mobile device of claim 1, wherein the physical attributes comprise a floor plan of the property and the trusted source comprises a government entity.

3. The mobile device of claim 1, wherein the physical attributes comprise a blueprint from the trusted source, and GPS coordinates of the property location from a second trusted source.

4. The mobile device of claim 3, wherein the processor-executable instructions that cause the mobile device to determine that the one or more digital videos completely represents the physical attributes comprises instructions that cause the mobile device to:
   determine a first square footage of the property based on the blueprint;
   determine a second square footage of the property based on the one or more digital videos;
   compare the first square footage to the second square footage; and
   determine that the one or more videos completely represents the property when the first square footage matches the second square footage.

5. The mobile device of claim 1, further comprising:
   an electronic display coupled to the processor;
   wherein the physical attributes comprise a floor plan of the property, and wherein the processor-executable instructions comprise further instructions that causes the mobile device to:
   cause, by the processor, an interactive map to be presented via the display, the interactive map comprising a representative view of the property and an indication of a location of the mobile device; and
   overlay, by the processor, the floor plan of the property over the representative view of the property.

6. The mobile device of claim 5, wherein the processor-executable instructions comprise further instructions that causes the mobile device to:
   generate, by the camera module, a first video of a room inside the property;
   determine, by the location module, a location of the mobile device when the first video is generated;
   compare the location of the mobile device to the floor plan;
   determine that the mobile device is located in a first room as shown in the floor plan; and
   modify the floor plan presented on the display to indicate that a view of the first room has been recorded.

7. The mobile device of claim 1, wherein the physical attributes comprise a GPS location of the property and a blueprint of the property, and wherein the processor-executable instructions comprise further instructions that causes the mobile device to:
   calculate, by the processor, one or more location coordinates of one or more features of the property based on the GPS location of the property and dimensions of the property as provided by the blueprint.

8. The mobile device of claim 7, wherein the processor-executable instructions that cause the mobile device to generate a rendering of the physical attributes comprises instructions that cause the mobile device to:
   generate, by the camera module, a first video of a first location inside the property;

determine, by the location module, a location of the mobile device when the first video is generated;

compare the location of the mobile device to the one or more location coordinates of the property;

determine that the mobile device is in a first area of the property based on the comparison; and modify the floor plan presented on the display to indicate that a view of the first location has been recorded.

9. The mobile device of claim 1, further comprising:

a user input device coupled to the processor; and an electronic display coupled to the processor;

wherein the processor-executable instructions comprise further instructions that causes the mobile device to:

extract, by the processor, a listing of areas of the property from the physical attributes;

cause, by the processor, the listing to be presented on the display;

create, by the camera module, a first digital video of a first area of the property;

receive, by the processor via the user input device, a selection of an area of the property included in the listing; and modify, by the processor, the listing to indicate that a view of the first area has been recorded.

10. The mobile device of claim 1, wherein the processor-executable instructions that cause the mobile device to determine a path through the property comprises instructions that cause the mobile device to:

determine a first path from a first location of the property to a second location of the property;

determine a second path from the second location to the first location; and determine, by the processor, that a first digital video has been generated by the camera module showing the first path and a second digital video has been generated by the camera module showing the second path.

11. A method for providing a virtual walk-through of a property, comprising:

receiving, by a processor via a communication interface, physical attributes of the property from a trusted source;

determining, by the processor, a path through the property prior to a user entering the property that ensures each room in the property will be recorded;

displaying the path to the user via an electronic display for use by the user to traverse the property in accordance with the path creating, by a camera module, one or more digital videos of the property;

determining, by the processor, that the one or more digital videos completely represents the physical attributes, based on a comparison of the one or more digital videos with the physical attributes; and uploading, by the processor via the communication interface, the one or more videos only when the one or more videos completely represents the physical attributes of the property, based on the comparison of the one or more digital videos with the physical attributes.

12. The method of claim 11, wherein the physical attributes comprise a floor plan of the property and the trusted source comprises a government entity.

13. The method of claim 11, wherein the physical attributes comprise a blueprint from the trusted source, and GPS coordinates of the property location from a second trusted source.

14. The method of claim 13, wherein determining that the one or more digital videos completely represents the physical attributes comprises:

determining, by the processor, a first square footage of the property based on the blueprint;

determining, by the processor, a second square footage of the property based on the one or more digital videos;

comparing, by the processor, the first square footage to the second square footage; and determining, by the processor, that the one or more videos completely represents the property when the first square footage matches the second square footage.

15. The method of claim 11, further comprising, wherein the physical attributes comprise a floor plan of the property, the method further comprising:

causing, by the processor, an interactive map to be presented via a display, the interactive map comprising a representative view of the property and an indication of a location of the mobile device; and causing, by the processor, the floor plan to be overlaid on top of the representative view of the property.

16. The method of claim 15, further comprising:

generating, by a camera module, a first video of a room inside the property;

determining, by the location module, a location of the mobile device when the first video is generated;

comparing, by the processor, the location of the mobile device to the floor plan; and determining, by the processor, that the mobile device is located in a first room as shown in the floor plan; and modifying, by the processor, the floor plan presented on the display to indicate that a view of the first room has been recorded.

17. The method of claim 11, wherein the physical attributes comprise a GPS location of the property and a blueprint of the property, the method further comprising:

calculating, by the processor, one or more location coordinates of one or more features of the property based on the GPS location of the property and dimensions of the property as provided by the blueprint.

18. The method of claim 17, wherein generating a rendering of the physical attributes comprises:

generating, by the camera module, a first video of a first location inside the property;

determining, by the location module, a location of the mobile device when the first video is generated;

comparing, by the processor, the location of the mobile device to the one or more location coordinates of the property;

determining, by the processor, that the mobile device is in a first area of the property based on the comparison; and modifying, by the processor, the floor plan presented on the display to indicate that a view of the first location has been recorded.

19. The method of claim 11, further comprising:

extracting, by the processor, a listing of areas of the property from the physical attributes;

causing, by the processor, the listing to be presented on a display;

creating, by the camera module, a first digital video of a first area of the property;

receiving, by the processor via a user input device, a selection of an area of the property included in the listing; and modifying, by the processor, the listing to indicate that a view of the first area has been recorded.

20. The method of claim 11, wherein determining a path through the property comprises:
  determining, by the processor, a first path from a first location of the property to a second location of the property;
  determining, by the processor, a second path from the second location to the first location; and
  determining, by the processor, that a first digital video has been generated by the camera module showing the first path and a second digital video has been generated by the camera module showing the second path.

\* \* \* \* \*